United States Patent [19]

Gelin

[11] Patent Number: 4,952,366
[45] Date of Patent: Aug. 28, 1990

[54] MOLDING PROCESS

[75] Inventor: Robert J. Gelin, Newark, Ohio

[73] Assignee: Owens-Corning Fiberglas Corporation, Toledo, Ohio

[21] Appl. No.: 401,590

[22] Filed: Aug. 31, 1989

Related U.S. Application Data

[63] Continuation of Ser. No. 223,317, Jul. 25, 1988, abandoned, which is a continuation of Ser. No. 44,533, May 1, 1987, abandoned.

[51] Int. Cl.$^5$ .................. B29C 45/14; B29C 43/56
[52] U.S. Cl. .................. 264/511; 264/40.4; 264/257; 264/137; 65/4.4; 65/9
[58] Field of Search .......... 156/181; 264/510, 511, 264/101, 134, 135, 136, 137, 257, 258, DIG. 57, 40.4, 40.5, 40.7; 65/4.4, 9; 425/80.1, 81.1, 83.1

[56] References Cited

U.S. PATENT DOCUMENTS

| | | | |
|---|---|---|---|
| 2,357,392 | 9/1944 | Francis, Jr. | 425/83.1 |
| 2,609,539 | 9/1952 | Shearer | 425/80.1 |
| 2,725,601 | 12/1955 | Brenner | 425/80.1 |
| 2,986,780 | 10/1958 | Bletzinger | 65/4.4 |
| 3,170,197 | 6/1961 | Brenner | 425/81.1 |
| 3,337,669 | 2/1965 | Shannon et al. | 65/4.4 |
| 3,344,007 | 8/1967 | Skoggard | 425/130 |
| 3,502,763 | 3/1970 | Hartmann | 264/511 |
| 3,511,625 | 5/1970 | Pitt | 65/4.4 |
| 3,546,898 | 12/1970 | Langlois et al. | 65/4.4 |
| 3,567,814 | 3/1971 | Glesner | 264/245 |
| 3,664,909 | 5/1972 | Ackley | 65/4.4 |
| 3,669,638 | 6/1972 | Wong et al. | 264/116 |
| 3,809,739 | 5/1974 | Gelin | 264/314 |
| 3,915,681 | 10/1975 | Ackley | 65/9 |
| 4,044,188 | 8/1977 | Segal | 264/257 |
| 4,117,067 | 9/1978 | Charter et al. | 264/119 |
| 4,132,755 | 1/1979 | Johnson | 264/258 |
| 4,340,406 | 7/1982 | Neubauer et al. | 65/9 |
| 4,342,581 | 8/1982 | Neubauer et al. | 65/9 |
| 4,345,927 | 8/1982 | Picone | 65/4.4 |
| 4,410,385 | 10/1983 | Murphy et al. | 156/181 |
| 4,487,647 | 12/1984 | Semeghini et al. | 156/181 |
| 4,615,717 | 10/1986 | Neubauer et al. | 65/4.4 |
| 4,668,729 | 5/1987 | Kataoka | 264/511 |

FOREIGN PATENT DOCUMENTS

3511610  3/1989  Fed. Rep. of Germany .

Primary Examiner—Jay H. Woo
Assistant Examiner—Jeremiah F. Durkin, II
Attorney, Agent, or Firm—Patrick P. Pacella; James F. Porcello

[57] ABSTRACT

An improved process for the high speed production of structural preforms and molding the preform to produce a product having desired and predetermined fiber directionality and distribution. Continuous strand glass fiber is directly applied to a preform screen along with a resinous binder material. The fiber/binder composite preform is cured. The cured composite preform is transferred to a mold where the composite is injected with a resin and thereafter cured in the mold.

9 Claims, 6 Drawing Sheets

MOLDING PROCESS

This is a continuation of application Ser. No. 223,317, filed July 25, 1988 now abandoned which is a continuation of Ser. No. 044,533, filed May 1, 1987 now abandoned.

BACKGROUND OF THE INVENTION

This invention relates to an improved method of molding and producing fiber reinforced articles. In particular, the invention relates to a method for the high-speed production of articles from glass fiber reinforced plastics and polymers. The present invention facilitates the high volume production of large structural parts such as automotive primary structures.

A commonly accepted practice for the process of high-speed molding is disclosed in U.S. Pat. No. 3,809,739. This process involves the use of a plurality of latching mold dies which receive a charge of molding material, such as a sheet or mat, uncured molding compound (normally a resin material) and glass fiber reinforcement. The mat or sheet is formed around a lower die member and an upper die member is then securely latched to the lower die member. The molding pressure of the closed die members causes the sheet molding compound to flow over the mold, sealing the sheet or mat into the mold cavity of the mold die. The loaded mold die is pressed in a mold press, cured and the molded article is then removed. However, problems have been encountered with this process when attempting the high speed production of large structural items. If the mold dies have sharp angles and deep contours into which the reinforcement matting must be pressed, there is a tendency for the mat to flow unevenly while being pressed into the mold.

In addition, the present processes are also hampered by the size limitations of the mats. Fiber reinforced products having a large size are currently produced by placing two smaller mats adjacent each other in a mold. Pressure is applied to the mats such that the edges of the adjacent mats flow toward one another under sufficient pressure to come into contact with each other. The smaller mats are thus formed into the larger mat having what is known as a "knitline" where the edges of the mats are joined together. However, as pressure is applied to the mats the resin molding compound flows more easily than the glass fiber reinforcement. The result is that there may be gaps or weak spots in the mat where relatively little or uneven amounts of glass fiber reinforcement are present along the knitline.

Further, the present molding processes encounter such problems as where the glass fiber strands of the mat separate or tear at the deeply contoured areas or sharp edges due to the pressures of the molding process. This results in an uneven distribution of the reinforcement mat during the molding process and produces a final molded product having inadequate structural strength in crucial areas.

Past efforts to improve upon this basic process have added a method step of preprocessing the mat or sheet into a "preform" which generally assumes the shape of the final molded product. The preform process generally includes the steps of chopping the glass fiber and feeding the glass fiber to a preform screen while applying a binder material. The composite glass/binder combination is then cured into a preform. The preform is then removed from the preform screen. The preform can then be stored or shipped for use in a later molding process to make a final fiber reinforced product. The additional step of making a preform assures greater distribution of the glass fiber and provides enhanced structural integrity of the final molded article. However, the added preforming step has been found to be undesirable in some manufacturing processes due to the necessary increase in manufacturing time. The use of chopped glass fiber may also, in some instances, continue to cause the preform to suffer similar problems of separation and tear out in crucial structural areas due to the pressures applied during the molding step.

Additional problems are encountered in the use of preforms of chopped glass fiber when the resin is injected into the screen. In particular, the placement of the chopped glass fiber on the screen is often imprecise, causing gaps in the glass fiber reinforcement. Also, the pressure applied by the screen to the chopped glass fiber and resin cause heavy areas of concentration of the chopped glass and thin sections of the resin. This unevenness causes the glass fiber to move about on the screen. In addition, the chopped glass has a tendency to clump together or be compacted into a very dense area such that when the resin is applied to the chopped glass the resin may be washed off rather than permeate the chopped glass.

The molding system of the present invention improves upon the quality and speed with which such large structural fiber reinforced structures can be produced at high volume.

Accordingly, an object of this invention is to reduce the number of manufacturing steps in the molding process of large structural fiber reinforced products.

Another object of this invention is to increase the quality of the distribution of glass fibers throughout the fiber reinforced product.

Yet another object of this invention is to provide a molded product in which the resin is easily injected through the glass fiber mat to thoroughly permeate the glass fiber preform.

These objects are achieved with the present invention by directly distributing continuous strand glass fiber to a preform screen from a glass fiber manufacturing apparatus. A binder material is applied as multiple layers of the continuous strand glass fiber are placed upon the preform screen. The binder material can be applied as a liquid material, a slurry, or a dry particulate material. The distribution of the glass fiber strands achieves the desirable fiber distribution and structural strength of the preform. The preform can be used immediately in a molding process or can be stored or shipped for a later use.

In the molding process the preform is cured and then is placed into a mold. The preform is sealed in the mold, injected with a resin material and allowed to cure. After the molded preform article is cured, it is removed from the mold. The present invention successfully achieves the high speed production of large structural parts. The present invention eliminates the necessity of chopping the glass fiber for feeding to a preform screen. The present invention also eliminates the need to apply pressure to the mold containing the preform during the molding process.

Other objects and advantages of the invention will be apparent from the following description of the preferred embodiment thereof, with reference being made to the accompanying drawings.

DESCRIPTION OF THE PREFERRED EMBODIMENT

The present invention may be adapted for use in the production of any molded article made of a fiber reinforced plastic or polymer. The preferred embodiment of this invention, without intent to limit the scope of the invention, will reference the manufacture of glass fiber reinforced structural articles.

The process of the present invention provides a method of producing a structural preform and molding the preform to produce a product having desired and predetermined fiber distribution, with few rejects, in a high speed production setting. The achievement of this goal lies in the application of continuous strand glass fiber directly to the preform screen from a pullwheel of a glass fiber manufacturing apparatus to produce a preform reinforcement. The preform production line setting of the present invention envisions the use of a plurality of preform screens sequentially spaced and set to achieve continuity in the application of the glass fiber and binder, the curing of the preform, and unloading of the preform from the production line. In one embodiment the preform, after unloading, can be directly transferred to the final molding line which consists of a carousel assembly carrying a plurality of final product molds. The molds are carried on the carousel so that various preforms are continually received by the molds while other preforms are receiving resin injections and other preforms are being cured and then removed from the carousel assembly.

Figure 1:
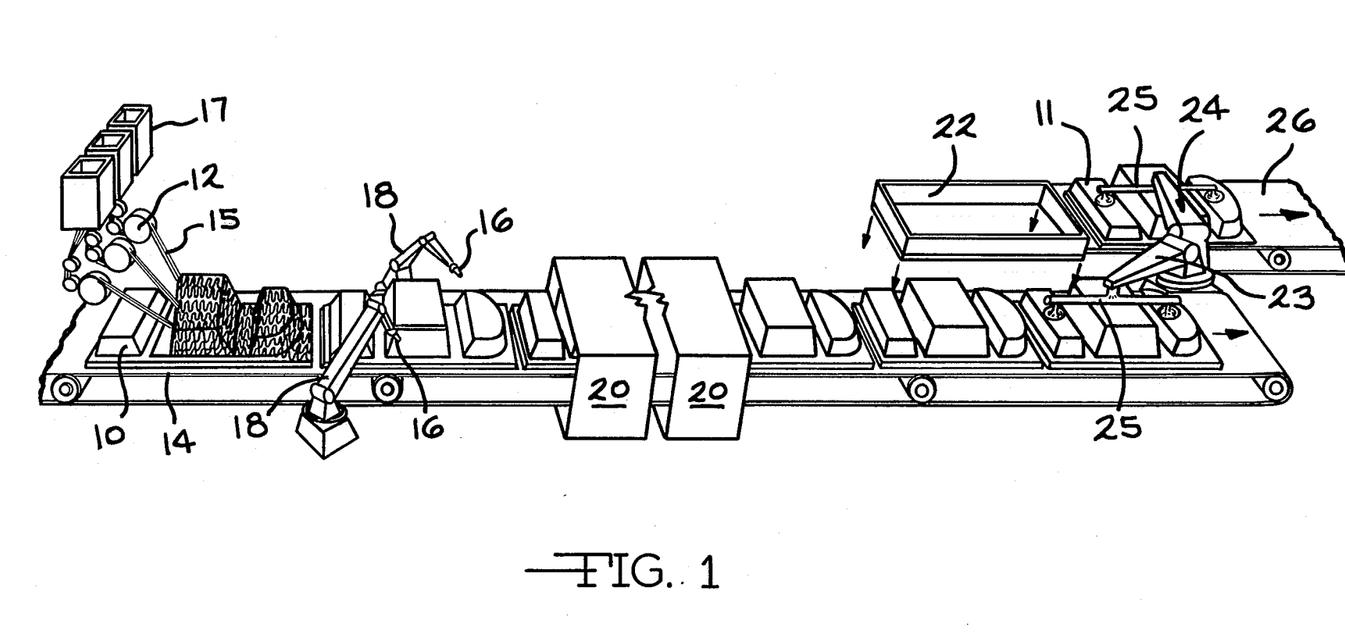
FIG. 1 is a schematic view of the preform process line of the present invention.

Referring now to FIG. 1, the preferred embodiment of a portion of the preform molding operation will be described. A series of preform screens 10 are placed on a conveyer 14 for movement through a series of work stations. The conveyer 14 is continuously moving so that each of the preform screens concurrently move through different work stations, thus receiving a sequential series of operations. In the case of a belt-type conveyer 14, there is a means (not shown) to reposition the preform screen 10 from the end to the head of the conveyer 14.

The preform screen 10, in a preferred embodiment, is constructed of a screen mesh material which is air permeable. Air is drawn through the screen 10 by a vacuum source (not shown). To initiate the preform molding process, the conveyer 14 places the preform screen 10 under at least one pullwheel 12 of the glass manufacturing apparatus (not shown). In the embodiment shown three pullwheels 12 are positioned adjacent the preform screens. Continuous strand glass fiber 15 is distributed on the preform screen 10 directly from the pullwheels 12. The glass fiber 15 is drawn to and held in place on the preform screen 10 by the air stream created by the vacuum source. Application of the glass fiber the preform screen 10 by the pullwheels 12 is controlled by programming the oscillator control (not shown) of each pullwheel to throw the glass fiber strands in preset directions and deliver multiple layers of glass fiber to achieve the desired directionality and placement of the fibers.

In one embodiment of the invention, a plurality of bushings (not shown) produce glass filaments at a rate of 78 pounds each hour per bushing. Each bushing is adjacent a pullwheel. Glass coming off the pullwheel is directed by three independent degrees of freedom. The sweep of the pullwheel as it traverses the conveyor provides a first degree of freedom (DOF). The ability to tilt or yaw the pullwheel to distribute continuous strands at angles to the preform screen provides a second DOF. The oscillation of the fingerwheel (not shown) within the pullwheel provides the third DOF. The DOF's create a plane of continuous strand mat. The sweep rate is controlled at every point in the sweep by a servo-motor programmable control (not shown). The transverse control is performed by a yaw of the pullwheel or transverse air blasts by a sonic diffuser. Also, the pullwheels, along with graphite spacer wheels and idler wheels (not shown), can be rotated 180 degrees about a vertical axis for different sweep directions. Each pullwheel throws the glass fiber onto the preform screen in a particular pattern. In a preferred process, each pullwheel deposits about one-fortieth of the desired density of the preform. It is also preferred that at least four patterns of the glass fiber filaments be thrown onto the prescreen, each defined by a different angle. The pullwheels rotate about a vertical axis, so the placement patterns of each pullwheel are interchangeable.

If a pullwheel breaks out, all remaining bushings slow their placement patterns one-fortieth and the belt slows one-fortieth so that the preform density stays the same. If additional pullwheels break out, the movements are slowed further. In the rare situation where many pullwheels of one pattern break out, then a few pullwheels may change to the lost pattern. This way the fiber orientations of the preforms are conserved, regardless of pullwheel performance.

Figure 2:
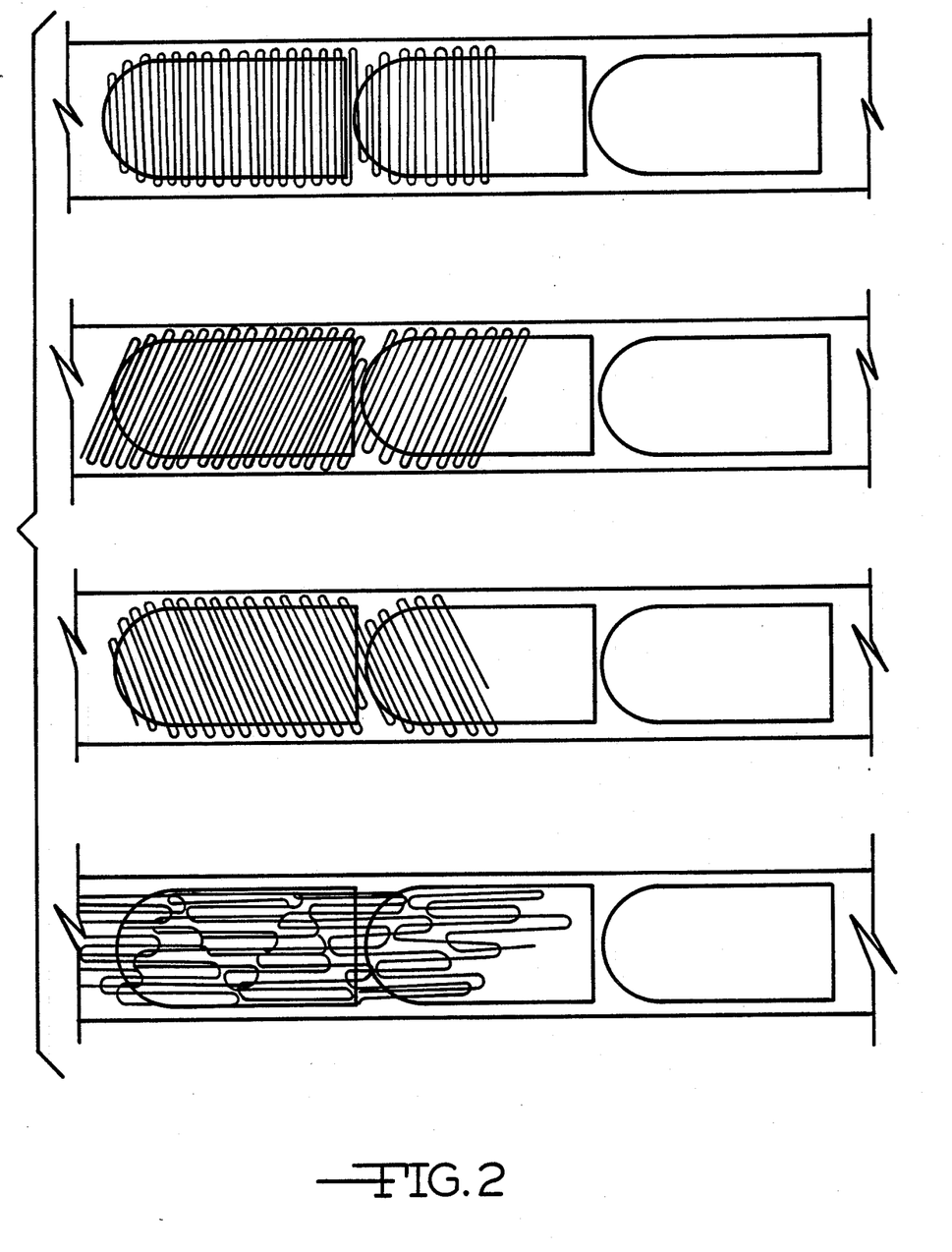
FIG. 2 is a schematic diagram of various preform patterns for conveyor belts traveling right to left; (a) regular pattern; (b) positive bias pattern; (c) negative bias pattern; and, (d) longitudinal pattern.

In a preferred process, it is desired that between four and eight patterns be used to deposit glass on the preform screen. One pattern is a sweep perpendicular to the belt movement, like the continuous strand mat lines. To square the pattern, to avoid the zig-zag throw, blowers or yaw (not shown), compensate for the continuous belt movement to leave a parallel stacking pattern. Bias throws are compensated similarly. A longitudinal sweep stacks across the belt at a rate to correspond to the turn-around angle necessary to completely cover the preform. A sketch of four patterns is depicted in FIG. 2. The movement of the conveyor belt is not considered to be an independent degree of freedom because it is redundant with components of the velocity vectors of the sweep and yaw (or blow).

To clarify the concept of glass filament deposition on a preform by density per local area the preform is mathematically divided into noded sections on a flat map. The plane at each node is defined by the unit vector lambda in a cartesian coordinate system as:

$$\underline{\lambda} = \cos\theta_x \underline{i} + \cos\theta_y \underline{j} + \cos\theta_z \underline{k} \quad (1)$$

where i, j, and k are unit vectors along the axes. The horizontal plane is defined by the vector j as:

$$\underline{\lambda}_h = \underline{j} \quad (2)$$

The maximum angle between the flat map (horizontal) and the plane of each node on the preform, $\theta$, is defined by the dot product of the vectors describing these planes.

$$\underline{\lambda} \cdot \underline{\lambda}_h = \cos\theta \quad (3)$$

Similarly, the dot product of the unit vectors of equations 1 and 2, $$\underline{\lambda} \cdot \underline{\lambda}_h = \cos\theta_y \quad (4)$$

yield the direction cosine of the vertical axis of the plane at each node on the preform. A combination of equations 3 and 4 shows that the steepest angle at each preform node is equal to the direction cosine of the vertical axis of the unit vector describing that plane at the node.

$$\theta = \theta_y \quad (5)$$

Figure 3:
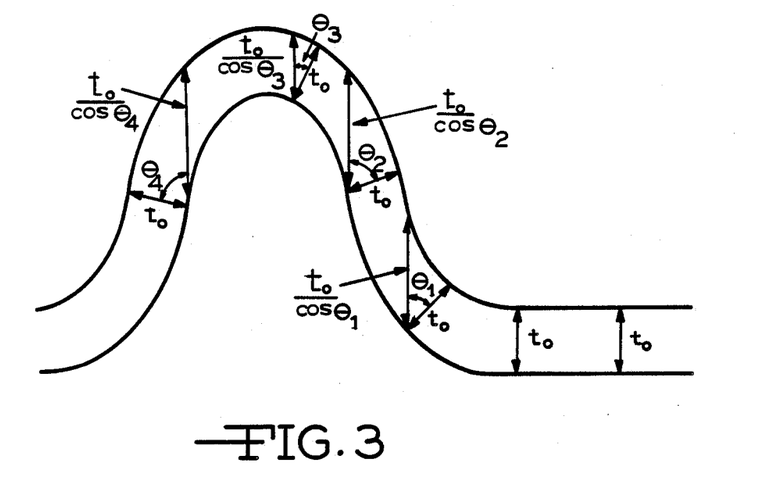
FIG. 3 is a schematic diagram showing a two-dimensional contour compensation for density of a preform.

The angle calculated in equation 5 at every node describes the areal density of glass to be deposited by the pullwheels on the preform screen. If a node on a preform is to be 7 ounces per square foot in density, and the direction cosine for that plane along a vertical axis is ½, then 14 ounces of glass must be deposited at the node, measured in the vertical direction. A two-dimensional schematic of this vertical deposition concept is shown in FIG. 3. The process is dependent on the pullwheel throw operation wherein glass is deposited on the preform screen at a rate inversely proportional to the relative sweep velocity of the thrown glass.

The ribbon of glass being deposited is not a ribbon of uniform thickness. The cross section of the ribbon is closer to a normal distribution, fat in the center and tapering to a thin edge. This shape serves to help even out the distribution. If the ribbon is about 6 inches wide, it is normally assumed to be about 4 inches wide of uniform thickness. In addition, the vacuum assist on the preform screen tends to draw glass to very local open packets to distribute the glass fibers uniformly for any small area.

To deposit the glass on the screens, the preform is mapped out in two steps. First, the entire preform is mapped out for the three-dimensional slope at every node, defined by the vertical direction cosine. This data is used to transform the preform to a flat plate. The nodes of the flat plate, in the second mapping step, are scaled for designed density. To illustrate, two examples are presented. The first example is a transformation from contour to flat. The second example documents the kinematic throw design of 40 bushings on a preform for an automobile underbody.

Figure 4:
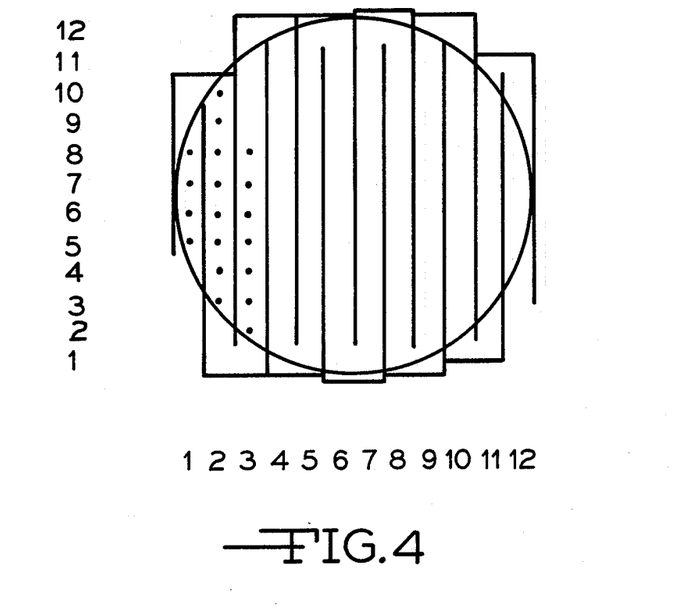
FIG. 4 is a diagram showing a superimposed stacking pattern over a preform having a hemisphere shape.
Figure 5:
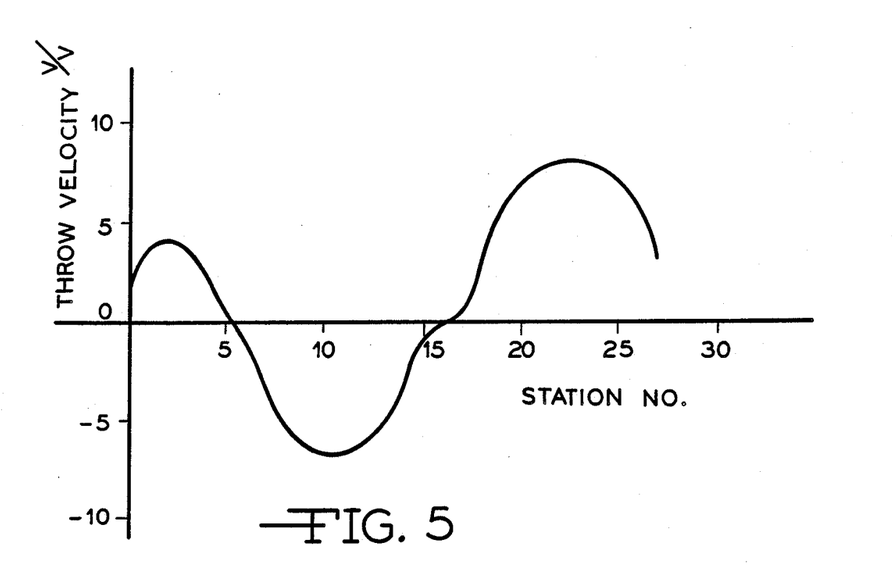
FIG. 5 is a graph showing the velocity profile for the sweep of a pullwheel on a hemisphere shape.

A hemispherical preform shape is a representative example of a contour of many slopes in various directions. A superimposed stacking path is shown in FIG. 4 over the hemisphere. Nodes 1 through 12 in the i and k directions define 144 nodes in a square. Table 1 lists the first 24 nodes of the stacking pattern, the direction cosine angle at each node, relative dwell times at each node, and corresponding speeds of sweep at each node. The incremental throw velocities are graphed in FIG. 5, for each station number, up to 24. The graph shows a smooth sinusoidal velocity with increasing amplitude for each sweep. After the relative velocity factors are assigned to each node of the contoured part, the preform can be thought of as a flat plate, or a two-dimensional preform of varying density profile.

Figure 6:
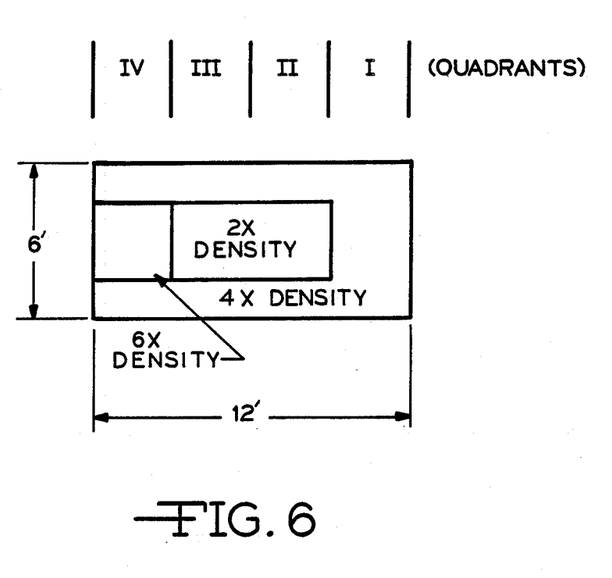
FIG. 6 is a design and contour scaling map for a direct process preform.

For the second example, a 6'×12' underbody preform is produced from the throws of a 40-bushing line. Each pullwheel throws 78 lbs/hr. Each preform requires 10 percent waste for turnaround of the sweep, so each preform requires 80 sq. ft. Each preform has 50 lbs. of glass, and 62 pieces are produced per hour. The conveyor belt moves at 744 ft/hr when 40 bushings are running. Conveyor belt speeds for bushing break-outs are listed in Table 2. The underbody density profile is shown in FIG. 6. To deposit densities of two, four, and six units, the sweep and yaw rates are continuously varied. For regular sweeping in the 6' direction across the belt, the sweep rate are 6.98 ft/sec, and 2.32 ft/sec, the two, four, and six units of density, respectively. In quadrants I, II, III, and IV, the yaw speeds are average speeds of 0.27, −0.5, −0.5, and 0.74 in/sec resulting in displacements from center of 3.92, −3.34, −10.6, and 0.0 in. For a 10.6 in. maximum yaw, the rotation of the pullwheel about the horizontal axis is about 8 degrees for a 6 foot throw drop. It is important to note that in this severe example of thickness change, the maximum yaw speed was under 1 inch per second and required a displacement from center of less than 1 ft.

In addition, any preform contoured layer can be made by this process. The contoured shape is transformed into a flat plate of varying densities. This glass distribution is then scaled up or down in density per design considerations. The sweep rate is controlled on each pullwheel to yield the scaled density of glass at each point. Transverse to the sweep, the glass filament throw direction is controlled by wheel yaw, or sonic diffusers. Each of 40 throwers deposit one-fortieth of the density of each part. When pullwheels break out, all sweep, yaw, oscillation and belt travel speeds are reduced by one part of about 40 pullwheels. Then all preforms have the same final density throughout. The sweep, yaw and oscillation movements allow for 3 degrees of freedom, which is all that is necessary to make a contoured layer of variable density.

Referring again to FIG. 1, as the glass fiber is being applied to the preform mold, a resinous binder is applied to the glass fiber stranding by applicators 16, such as spray guns. The binder material generally is present in about a 2-10% ratio of glass to binder. The binder material is generally a thermoplastic or thermosetting polyester material and can be applied to the glass as a liquid, dry particles, or a slurry. Alternatively, a matrix resin material can be applied to the glass instead of the binder material. The matrix material can include binder material, a curing agent which acts as a catalyst, filler materials (such as clay, carbonates, etc.) or thickening agents. The binder, after curing, creates a memory in the glass fiber enabling it to retain the shape of the preform mold 10. This resinous binder is applied in preprogrammed amounts by the applicators 16 which are carried and moved in preprogrammed directions by a movable arm such as a robot arm 18. The applicators 16 may also be operated in an automated system or even manually, a choice of which is dependent upon the rate of production, article size, and other factors. The steps of glass fiber application and binder application may be repeated any number of times to achieve the desired structural integrity of the composite preform. If desired, discrete fiber rovings may also be placed into the composite preform as it is receiving the multiple applications of continuous strand glass fiber and binder in order to achieve desired increases in structural integrity of the composite preform. In preferred processes the fiber rovings are automatically positioned on the composite preforms by robotic equipment.

After the application of the glass fiber and binder material or matrix material to form the composite preform 11, the conveyer 14 moves the preform screen 10 and preform 11 to the oven 20. The preform 11 is heated to set the binder and thereby set the shape of the preform 11. In a preferred process, a vacuum pressure is maintained on the screen 10 throughout the heating step. Without the vacuum pressure the preform 11 may tend to fall away from the vertical surfaces of the screen 10. The preform 11 is then trimmed by an edge trimmer 22. After trimming, the preform 11 is removed from the preform screen 10. The removal of the preform 11 is accomplished by an unloading device 24. The unloading device 24 comprises a robot arm 23 carrying a vacuum pick-up 25 which removes the preform 11 from the preform screen 10 and places the preform in position for the final molding operation. The design of the unloading device 24 is dictated by the article size and rate of production and other factors. In some instances, it may be preferably to manually remove the preform 11 from the screen 10.

Figure 7:
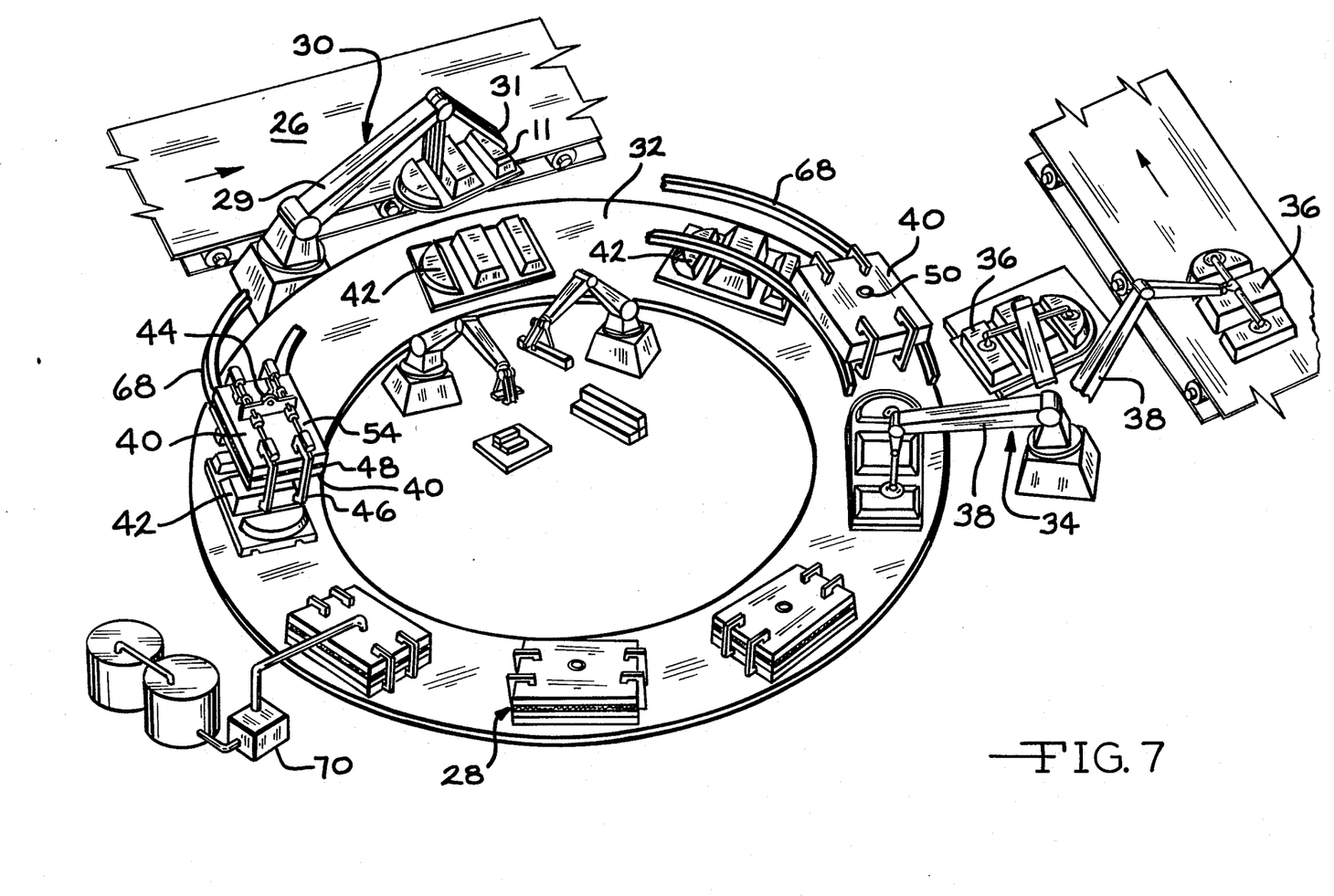
FIG. 7 is a schematic view of the final molding process line of the present invention.

A two-step procedure is shown in FIGS. 1 and 7 wherein the preform 11 is placed onto a second conveyer 26 by the unloading device 24 for transfer to the final molding operation. Another method might envision the preform 11 being directly placed into the lower half of a mold 28 by the unloading device 24. Yet another method envisions a plurality of preforms being stacked together by the unloading arm for storage or transfer to another area of the manufacturing facility.

Figure 8:
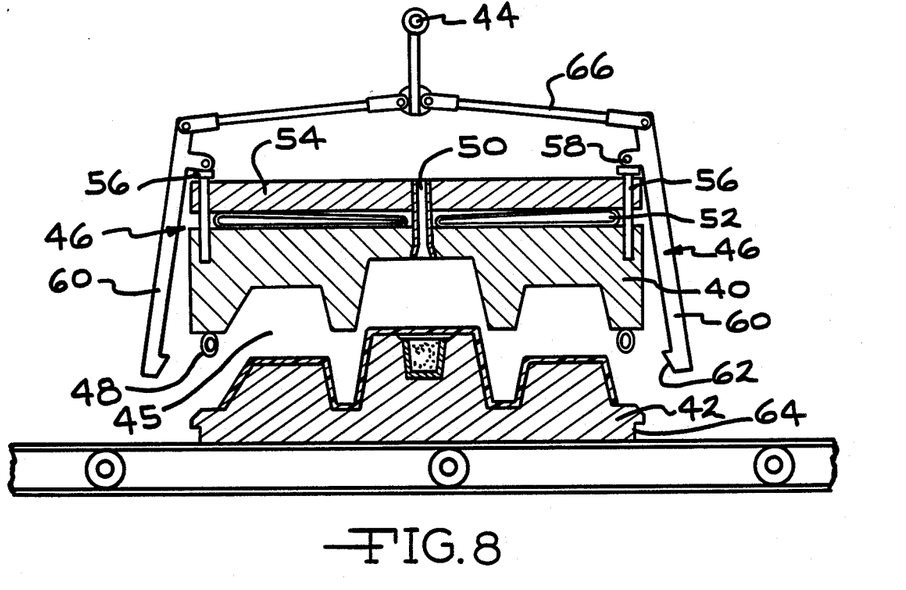
FIG. 8 is a side view of an open mold used in the process of the present invention.
Figure 9:
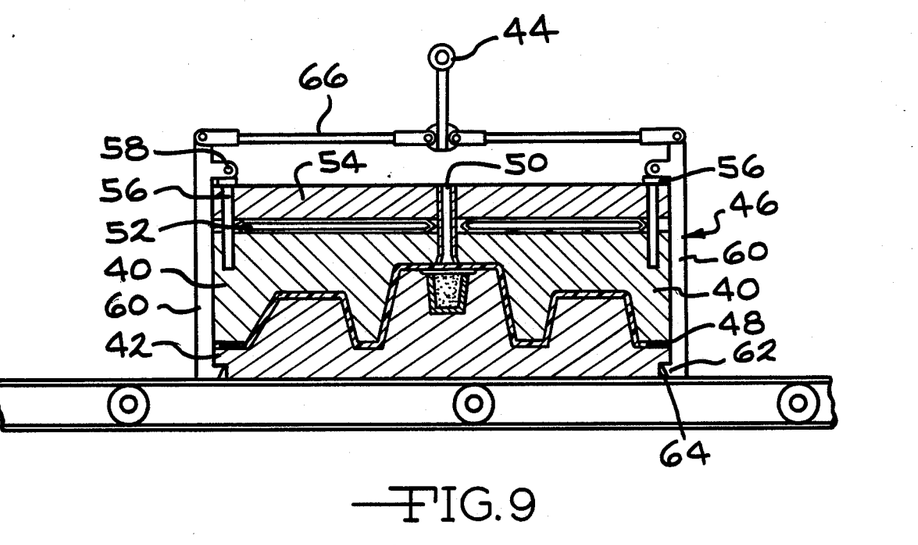
FIG. 9 is a side view of mold of FIG. 8 in a closed position.

Referring now to FIG. 7, the preform 11 is transported to the final molding operation by a second conveyer 26. A loading device 30, similar to the unloading device 24 is stationed proximate the second conveyer 26 and a carousel 32 carrying the molds 28. The design of the loading device 30 is, as is the design of the unloading device 24, dependent upon the article size and rate of production. The loading device 30, depicted in FIG. 7 is a robot arm having a vacuum pick-up. The carousel 32 transports a plurality of molds 28 for movement through a series of work stations in the final molding operation. The molds 28 are spaced on the carousel 32 so that individual molds 28 are concurrently located at differing work stations and are receiving different operations in the molding process, thus allowing for the high speed production of the final molded article. The molds 28 used in the present invention are similar to those described in U.S. Pat. No. 3,809,739. The molds 28 will be generally described herein. If a more detailed description of the molds 28 is needed, reference is made to the '739 patent. The molds 28 each include a pair of matched upper and lower die members (40,42). The upper and lower die members (40,42), when mated form a mold cavity 45 which receives the preform 11. Referring to FIGS. 8 and 9, the lower die member 42 is supported by the surface of the carousel 32. The upper die member 40 is secured to a plate 54 by means of removable pins 56. The removable pins 56 permit the use of different dies for the production of different molded articles to be supported by the plate 54.

The plate 54 and adjoining surface of the upper die member 40 are spaced apart and an expandable bladder 52 is located therebetween. The expandable bladder 52 is coextensive with the surface area of the upper die member 40. A fluid supply and vent line (not shown) are connected to the bladder 52 to supply either a liquid or gas fluid under pressure to the bladder 52 for inflation and to vent the bladder 52 for deflation.

A plurality of clamping members 46 are secured to the plate 54. The clamping members 46 are used to securely latch the upper die member 40 with the lower die member 42 during the molding process. The clamping members 46 each include a pivot member 58 fixed to the plate 54 and an arm member 60 extending downwardly along the edges of the upper and lower die members (40,42). A flange 62 located at the lower end of the arm member 60 is directed inward toward the lower mold die 42 to engage a slot 64 located in the lower die member and secure the upper and lower die members (40,42) together.

An upper lever arm 66 is connected to the opposed end of the arm member 60. The upper lever arm 66 of opposed arm members 60 engage a lifting eye 44. To separate the upper and lower mold dies (40,42), the lifting eye 44 is engaged by a hoist (not shown). The upward action of the hoist on the lifting eye 44 pulls the lever arms 66, causing the arm members 60 to rotate on their respective pivot members 58 thus disengaging their respective flanges 62 from their slots 64. The upper die member 40 is thus disengaged from the lower die member 42 and may be separated therefrom.

The upper die member 40 includes an inflatable seal 48 which extends around the perimeter of the die member 40. When the upper and lower die members 40, 42 are engaged, the seal 48 is inflated to completely enclose and seal the mold cavity 45. A resin port 50 is also located in the upper plate 54 and upper die member 40 through which resin is injected into the sealed mold cavity 45. The final closure of the mold is programmed so that the injection of resin is timed for optimum flow of the resin material on to the preform.

Referring again to FIG. 7, the operation of the final molding process proceeds as follows: The lower die member 42 is transported by the carousel 32 to its starting position proximate the loading device 30. The loading device 30 receives the preform 11 from the second conveyer 26 and places the preform 11 over the lower die member 42. The upper die member 40, which is supported on a track 68 above the carousel 32, is lowered onto the lower die member 42 by the hoist (not shown). The clamping members 46 are secured and the seal 48 is inflated. The sealed mold die 28 containing the preform 11 is transported by the carousel 32 to a resin injection apparatus 72 which is automatically programmed to inject the resin into the mold 28. The inflatable bladder 52 is inflated to compress the preform 11, thus ensuring compact fiber placement permeated with the resin. The carousel 32 continues to transport the mold 28 containing the compressed preform 11 and resin to the unloading apparatus 34. The resin is either cured or set between the resin injection apparatus 72 and the unloading apparatus 34. At the unloading apparatus 34, the lifting eye 44 is engaged by the hoist (not shown) and the upper die member 40 is removed and placed upon the track 68 for return to the starting position. A suitable unloading means 38, such as the robot arm with vacuum pick-up described earlier, removes the final molded article 36 from the lower mold die 42. The lower mold 42 is then cleaned and returned to the starting position.

It is understood that modifications and variations of the process may be introduced depending upon the specific requiments of the manufacturing facility, structural part, and the specific requirements of the resins and binders being used. The modifications are not intended to vary the scope of the invention as recited by the claims which follow.

TABLE 1
HEMISPHERE SWEEP VELOCITIES

| Location Station | Node i | Node k | Slope O | Dwell Time $t/t_o$ | Sweep Velocity $V/V_o$ |
|---|---|---|---|---|---|
| 1 | 5 | 1 | 69° | 2.75 | .36 |
| 2 | 6 | 1 | 66° | 2.46 | .41 |
| 3 | 7 | 1 | 69° | 2.75 | .36 |
| 4 | 8 | 1 | 77° | 4.54 | .22 |
| 5 | 9 | 1 | — | — | — |
| 6 | 10 | 1 | — | — | — |
| 7 | 10 | 2 | 72° | 3.21 | −.31 |
| 8 | 9 | 2 | 59° | 1.94 | −.51 |
| 9 | 8 | 2 | 52° | 1.63 | −.61 |
| 10 | 7 | 2 | 49° | 1.52 | −.66 |
| 11 | 6 | 2 | 49° | 1.52 | −.66 |
| 12 | 5 | 2 | 52° | 1.63 | −.61 |
| 13 | 4 | 2 | 59° | 1.94 | −.51 |
| 14 | 3 | 2 | 72° | 3.21 | −.31 |
| 15 | 2 | 2 | — | — | — |
| 16 | 1 | 2 | — | — | — |
| 17 | 1 | 3 | — | — | — |
| 18 | 2 | 3 | 72° | 3.21 | .31 |
| 19 | 3 | 3 | 56° | 1.77 | .57 |
| 20 | 4 | 3 | 44° | 1.39 | .72 |
| 21 | 5 | 3 | 39° | 1.29 | .77 |
| 22 | 6 | 3 | 36° | 1.23 | .81 |
| 23 | 7 | 3 | 36° | 1.23 | .81 |
| 24 | 8 | 3 | 39° | 1.29 | .77 |

TABLE 2
BELT SPEEDS FOR REDUCED BUSHING OPERATION DUE TO BREAKOUTS

| Number of Bushings Remaining | Belt Speed (ft/hr) |
|---|---|
| 40 | 744 |
| 39 | 725 |
| 38 | 707 |
| 37 | 688 |
| 36 | 670 |

I claim:

1. A process for the manufacture of a three-dimensional fiber preform having predetermined areas of enhanced structural integrity comprising the steps of:
providing an air permeable screen having a three-dimensional preshaped surface defining such preform;
dividing such screen into noded sections as if on a flat map wherein the three-dimensional plane at each such noded section is defined by the unit vector $\underline{\lambda}$ in cartesian coordinate system as $\underline{\lambda} = \text{Cos } \theta_x \underline{i} + \text{Cos } \theta_y \underline{j} + \text{Cos } \theta_z \underline{k}$ and i, j and k are unit vectors along the axes, $\theta$ is the maximum angle between the horizontal flat map and the plane of each noded section on such screen, and the areal density of glass to be deposited at each such noded section is controlled by the equation $\theta = \theta_y$;
calculating the areal density of glass to be applied at each such noded section and programming at least one glass fiber pullwheel to deposit glass in predetermined patterns and amounts in accordance with said calculations;
applying continuous glass fiber from at least one pullwheel of a glass fiber manufacturing apparatus to each such noded section of such screen in such calculated patterns and amounts;
drawing air through such screen; and
passing such screen past such pullwheel at a predetermined rate of travel calculated to coordinate with said rate of application from such pullwheel and achieve said desired glass fiber densities over such screen.

2. The process of claim 1, further including the step of programming such pullwheel to apply such glass fiber in at least four distinct patterns.

3. The process of claim 1, further including the step of varying said rate of travel of such screen in coordination with variations in said rate of application for such pullwheel to maintain said desired glass fiber densities over such screen.

4. The process of claim 1, further including the step of programming each of such individual pullwheels to vary its respective application pattern to compensate for any loss of application pattern from any of such remaining pullwheels.

5. The process of claim 1, further including the step of applying a resinous binder to such glass fiber during distribution of such fiber onto such screen.

6. A process for the manufacture of a three-dimensional fiber preform comprising the steps of:
providing an air permeable screen having a three-dimensional preshaped surface defining such preform;
dividing such screen into noded sections as if on a flat map wherein the three-dimensional plane at each such noded section is defined by the unit vector $\underline{\lambda}$ in a cartesian coordinate system as $\underline{\lambda} = \text{Cos } \theta_x \underline{i} + \text{Cos } \theta_y \underline{j} + \text{Cos } \theta_z \underline{k}$ and i, j and k are unit vectors along the axes, $\theta$ is the maximum angle between the horizontal flat map and the plane of each noded section on such screen, and the areal density of glass to be deposited at each such noded section is controlled by the equation $\theta = \theta_y$;
calculating the areal density of glass to be applied at each such noded section;
programming a plurality of glass fiber pullwheels to distribute continuous glass fiber strands in at least four distinct patterns, in accordance with said calculations, such patterns being created by programmed control over the sweep, yaw and oscillation of each pullwheel;
drawing air through such screen; and
passing such screen past such pullwheels at a predetermined rate of travel calculated to coordinate with such programmed pullwheels to supply said calculated glass fiber densities over each of such sections of such screen.

7. The process of claim 6, further including the step of programming the rate of travel of such screen and the distribution pattern of such pullwheels to vary and maintain the application of desired glass fiber densities regardless of the performance characteristics of any given pullwheel.

8. The process of claim 6, further including the step of applying a resinous binder to such glass fiber during distribution of such film onto such screen.

9. A process for the manufacture of a three-dimensional fiber reinforced article comprising the steps of:

providing an air permeable screen having a three-dimensional preshaped surface defining such article;

dividing such screen into noded sections as if on a flat map wherein the three-dimensional plane at each such noded section is defined by the unit vector $\underline{\lambda}$ in a cartesian coordinate system as $\underline{\lambda} = \cos\theta_x \underline{i} + \cos\theta_y \underline{j} + \cos\theta_z \underline{k}$ and i, j and k are unit vectors along the axes, $\theta$ is the maximum angle between the horizontal flat map and the plane of each noded section on such screen, and the areal density of glass to be deposited at each such node is controlled by the equation $\theta = \theta_y$;

calculating the areal density of glass to be applied at each such noded section;

programming a plurality of glass fiber pullwheels to distribute continuous glass fiber strands in accordance with said calculations in predetermined patterns and amounts, such patterns and amounts being created by said programmed control over the sweep, yaw and oscillation of each pullwheel;

drawing air through such screens;

passing such screen past such pullwheels at a predetermined rate of travel calculated to coordinate with such programmed pullwheels to supply said calculated glass fiber densities over each of such sections of such screen;

removing such glass fiber preform from such screen and placing such preform into a mold having an upper and lower member;

closing such upper and lower members around the glass fiber preform; and injecting a resin material into the closed upper and lower mold members to permeate the glass fiber preform and, thereafter such curing resin injected fiber reinforced preform.

* * * * *